(12) United States Patent
Choi et al.

(10) Patent No.: US 12,431,288 B2
(45) Date of Patent: Sep. 30, 2025

(54) MULTILAYER ELECTRONIC COMPONENT

(71) Applicant: SAMSUNG ELECTRO-MECHANICS CO., LTD., Suwon-si (KR)

(72) Inventors: Ho Sam Choi, Suwon-si (KR); Kyu Jeong Sim, Suwon-si (KR); Jung Jin Park, Suwon-si (KR); Hyo Sung Choi, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 140 days.

(21) Appl. No.: 18/523,082

(22) Filed: Nov. 29, 2023

(65) Prior Publication Data
US 2024/0266114 A1   Aug. 8, 2024

(30) Foreign Application Priority Data

Feb. 3, 2023   (KR) .................. 10-2023-0015100

(51) Int. Cl.
*H01G 4/30* (2006.01)
*H01G 4/12* (2006.01)
(Continued)

(52) U.S. Cl.
CPC ............ *H01G 4/1227* (2013.01); *H01G 4/30* (2013.01); *H01G 4/0085* (2013.01); *H01G 4/2325* (2013.01)

(58) Field of Classification Search
CPC ...... H01G 4/1227; H01G 4/30; H01G 4/0085; H01G 4/2325; H01G 4/224; H01G 4/1209;
(Continued)

(56) References Cited

U.S. PATENT DOCUMENTS

| 10,395,840 | B1* | 8/2019 | Park ................. H01G 2/065 |
| 2015/0348712 | A1* | 12/2015 | Lee ................. H01G 4/30 |
| | | | 156/89.12 |

(Continued)

FOREIGN PATENT DOCUMENTS

| JP | 2016-115918 A | 6/2016 |
| KR | 10-2017-0127398 A | 11/2017 |

(Continued)

OTHER PUBLICATIONS

The Extended European Search Report dated Jul. 19, 2024 issued in European Patent Application No. 23212000.6.

*Primary Examiner* — Timothy J. Dole
*Assistant Examiner* — Esther N Lian
(74) *Attorney, Agent, or Firm* — Morgan Lewis & Bockius LLP (57) ABSTRACT

A multilayer electronic component includes a body including a capacitance formation portion including a dielectric layer and an internal electrode alternately disposed in a first direction, and a cover portion disposed on both end surfaces of the capacitance formation portion opposing each other in the first direction, and an external electrode disposed on the outside of the body and connected to the internal electrode. The cover portion has a first region, adjacent to the capacitance formation portion, and a second region, adjacent to the outside of the cover portion. A content of fluorine (F) included in the second region is greater than a content of fluorine (F) included in the first region.

16 Claims, 8 Drawing Sheets

(51) Int. Cl.
*H01G 4/008* (2006.01)
*H01G 4/232* (2006.01)

(58) Field of Classification Search
CPC ........ H01G 4/228; H01G 4/005; H01G 4/018; H01G 4/12; H01G 4/012; C04B 2235/3203; C04B 2235/3206; C04B 2235/3208; C04B 2235/3215; C04B 2235/3217; C04B 2235/3262; C04B 2235/3275; C04B 2235/3284; C04B 2235/42; C04B 2235/442; C04B 2235/445; C04B 2235/75; C04B 2235/783; C04B 2235/785; C04B 2235/79; C04B 35/4682; C04B 35/553
See application file for complete search history.

(56) References Cited

U.S. PATENT DOCUMENTS

| | | |
|---|---|---|
| 2016/0172110 A1 | 6/2016 | Otani |
| 2019/0198245 A1 | 6/2019 | Sanner et al. |
| 2022/0157530 A1* | 5/2022 | Kim ..................... H01G 4/008 |
| 2022/0199324 A1* | 6/2022 | Seo ....................... H05K 1/181 |
| 2023/0170142 A1* | 6/2023 | Ono ..................... H01G 4/224 |
| | | 361/321.2 |
| 2023/0216051 A1* | 7/2023 | Kuriki ................ H01M 4/1393 |
| | | 429/231.8 |

FOREIGN PATENT DOCUMENTS

| | | |
|---|---|---|
| KR | 10-2019-0055807 A | 5/2019 |
| KR | 10-2022-0090416 A | 6/2022 |

* cited by examiner

MULTILAYER ELECTRONIC COMPONENT

CROSS-REFERENCE TO RELATED APPLICATION (S)

This application claims benefit of priority to Korean Patent Application No. 10-2023-0015100 filed on Feb. 3, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacitance and being easily mounted. With the miniaturization and high output power of various electronic devices such as computers and mobile devices, demand for miniaturization and implementation of high capacitance of multilayer ceramic capacitors has also been increasing.

In general, the multilayer ceramic capacitor may include a capacitance formation portion in which a dielectric layer and an internal electrode are alternately disposed to form a capacitance, and a cover portion for protecting the capacitance formation portion. As the dielectric layer is thinned to implement ultra-miniaturization and ultra-high capacitance of the multilayer ceramic capacitor, an issue such as degradation in withstand voltage and reliability properties of the multilayer ceramic capacitor may occur. In order to solve such an issue, a method of improving a density of the cover portion and reducing a size of dielectric grains included in the cover portion may be considered.

However, a reduction in the size of the dielectric grains included in the cover portion may be advantageous for securing withstand voltage and reliability properties, but may cause side effects such as occurrence of cracks due to external impacts. Therefore, there is a need for research into a cover portion structure capable of improving withstand voltage and reliability properties of multilayer ceramic capacitors while preventing the occurrence of cracks due to external impacts.

SUMMARY

An aspect of the present disclosure is to improve withstand voltage and reliability properties of a multilayer electronic component.

Another aspect of the present disclosure is to prevent cracks from occurring in a multilayer electronic component.

However, the aspects of the present disclosure are not limited to those set forth herein, and will be more easily understood in the process of describing specific example embodiments of the present disclosure.

According to an aspect of the present disclosure, there is provided a multilayer electronic component including a body having a capacitance formation portion including a dielectric layer and an internal electrode alternately disposed in a first direction, and a cover portion disposed on both end surfaces of the capacitance formation portion opposing each other in the first direction, and an external electrode disposed on the outside of the body and connected to the internal electrode. The cover portion may have a first region, adjacent to the capacitance formation portion, and a second region, adjacent to the outside of the cover portion. A content of fluorine (F) included in the second region may be greater than a content of fluorine (F) included in the first region.

According to another aspect of the present disclosure, there is provided a multilayer electronic component including a body having a capacitance formation portion including a dielectric layer and an internal electrode alternately disposed in a first direction, and a cover portion disposed on both end surfaces of the capacitance formation portion opposing each other in the first direction, and an external electrode disposed on the outside of the body and connected to the internal electrode. The cover portion may have a first region, adjacent to the capacitance formation portion, and a second region, adjacent to the outside of the cover portion. The second region may include fluorine (F). In some embodiments of the multilayer electronic component, A2>A1 may be satisfied, when an average size of dielectric grains included in the first region is referred to as A1 and an average size of dielectric grains included in the second region is referred to as A2.

According to example embodiments of the present disclosure, withstand voltage and reliability properties of a multilayer electronic component may be improved.

According to example embodiments of the present disclosure, cracks may be prevented from occurring in a multilayer electronic component.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a thickness (T) direction, a second direction may be defined as a length (L) direction, and a third direction may be defined as a width (W) direction.

Multilayer Electronic Component

Figure 1:
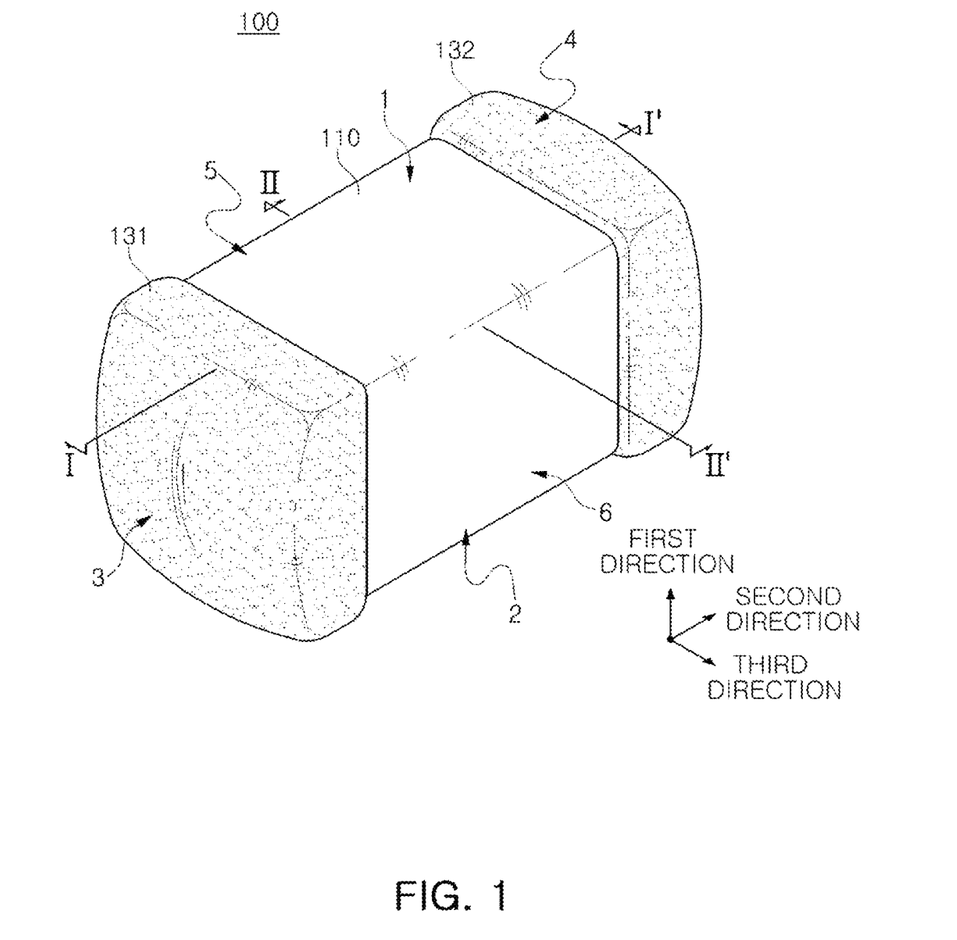
FIG. 1 is a perspective view schematically illustrating a multilayer electronic component according to an example embodiment of the present disclosure.

FIG. 1 is a perspective view schematically illustrating a multilayer electronic component according to an example embodiment of the present disclosure.

Figure 2:
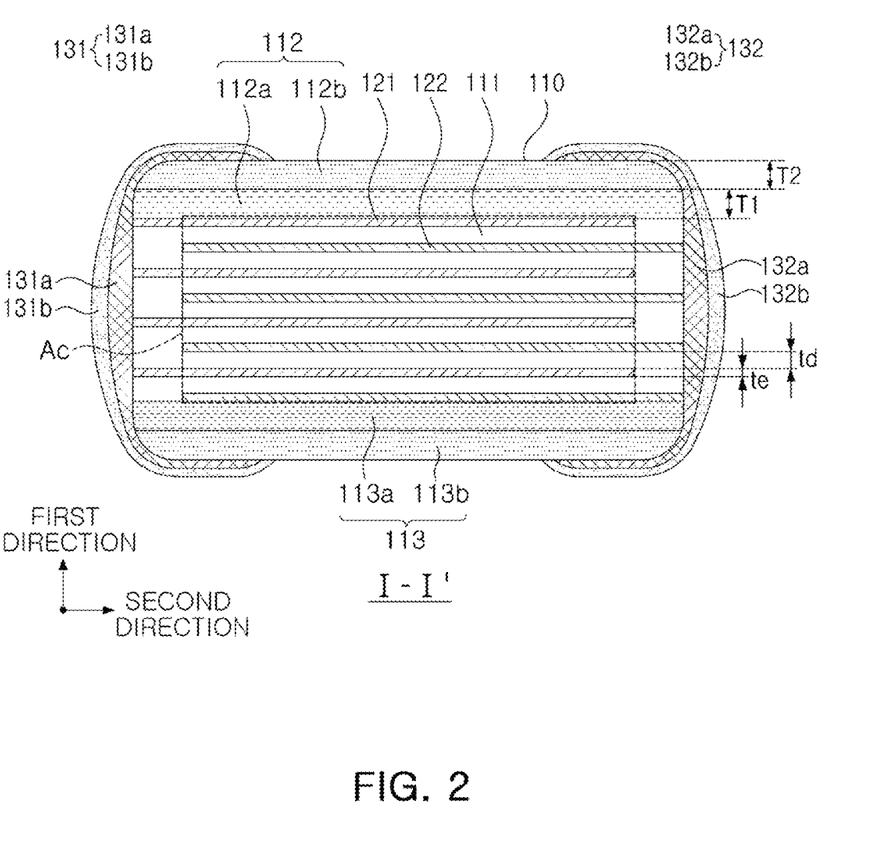
FIG. 2 is a schematic cross-sectional view taken along line I-I' of FIG. 1.

FIG. 2 is a schematic cross-sectional view taken along line I-I' of FIG. 1.

Figure 3:
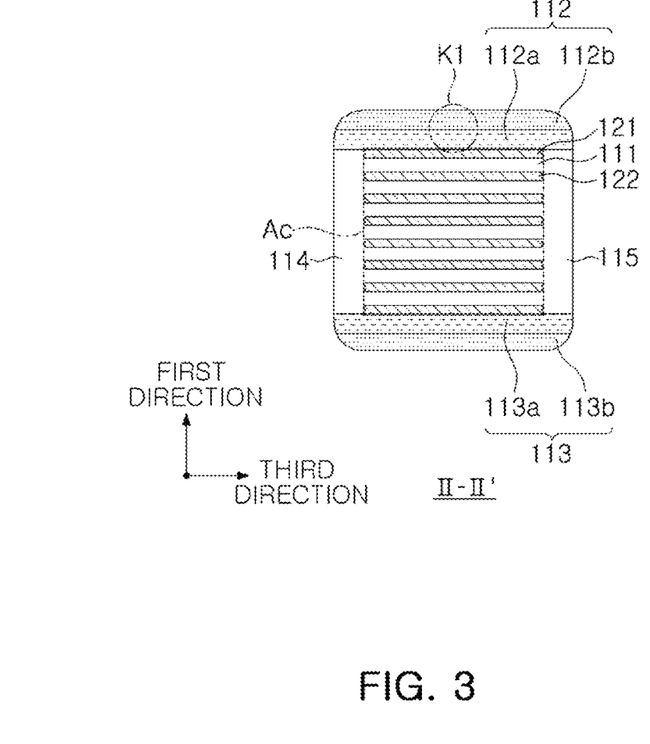
FIG. 3 is a schematic cross-sectional view taken along line II-II' of FIG. 1.

FIG. 3 is a schematic cross-sectional view taken along line II-II' of FIG. 1.

Figure 4:
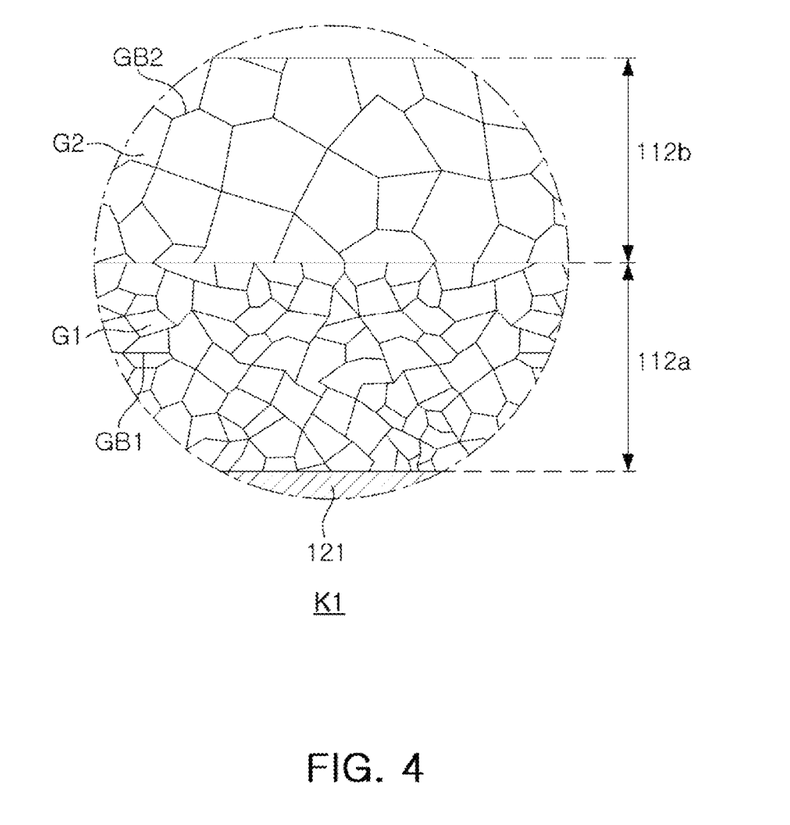
FIG. 4 is an enlarged view of region K1 in FIG. 3.

FIG. 4 is an enlarged view of region K1 in FIG. 3.

Hereinafter, a multilayer electronic component 100 according to some example embodiments of the present disclosure will be described in detail with reference to FIGS. 1 to 4. In addition, a multilayer ceramic capacitor (hereinafter referred to as "MLCC") is described as an example of the multilayer electronic component, but the present disclosure is not limited thereto, and may be applied to various electronic products, such as inductors, piezoelectric elements, varistors, thermistors, or the like.

The multilayer electronic component 100 according to some example embodiments of the present disclosure may include a body 110 including a capacitance formation portion Ac including at least one dielectric layer 111 and at least one internal electrode 121 or 122 alternately disposed in a first direction and first and second cover portions 112 and 113 disposed on both end surfaces of the capacitance formation portion opposing each other in the first direction, and first and second external electrodes 131 and 132 disposed on the outside of the body and connected to the internal electrode 121 or 122. The cover portion may have a first region 112a of the first cover portion 112 or a first region 113a of the second cover portion 113, adjacent to the capacitance formation portion Ac, and a second region 112b of the first cover portion 112 disposed on the first region 112a or a second region 113b of the second cover portion 113 disposed on the first region 113a, adjacent to the outside of the cover portion. A content of fluorine (F) included in each of the second regions 112b and 113b may be greater than a content of fluorine (F) included in each of the first regions 112a and 113a, respectively.

According to some example embodiments of the present disclosure, fluorine (F) included in the second region 112b or 113b may serves as a low-temperature sintering aid, thereby inducing grain growth and densification of dielectric crystal grains G2 included in the second region 112b or 113b. Accordingly, the second region 112b or 113b, adjacent to the outside of the cover portion 112 or 113, may have improved toughness to prevent cracks from occurring due to external impacts.

In addition, the content of fluorine (F) included in the second region 112b or 113b may be greater than the content of fluorine (F) included in the first region 112a or 113a, respectively, thereby improving the toughness of the second region 112b or 113b while controlling grain growth of the first region 112a or 113a, adjacent to the capacitance formation portion Ac to secure withstand voltage and reliability properties of the multilayer electronic component 100.

Hereinafter, respective components included in the multilayer electronic component 100 according to some example embodiments of the present disclosure will be described in more detail.

A specific shape of the body 110 is not particularly limited. However, as illustrated, the body 110 may have a hexahedral shape or a shape similar thereto. During a sintering process, ceramic powder particles included in the body 110 may shrink and an edge portion of the body 110 may be polished, such that the body 110 may not have a hexahedral shape having perfectly straight lines, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

In the body 110, the dielectric layer 111 and the internal electrode 121 or 122 may be alternately stacked. A plurality of dielectric layers 111, included in the body 110, may be in a sintered state, and adjacent dielectric layers 111 may be integrated with each other such that boundaries therebetween are not readily apparent without using a scanning electron microscope (SEM).

The dielectric layer 111 may be formed by preparing a ceramic slurry including ceramic powder particles, an organic solvent, and a binder, coating a carrier film with the slurry and drying the slurry coated on the carrier film to prepare a ceramic green sheet, and then sintering the ceramic green sheet. The ceramic powder particles are not particularly limited as long as sufficient capacitance is obtainable therewith. For example, a barium titanate-based material, a lead composite perovskite-based material, or a strontium titanate-based material may be used for the ceramic powder particles. Examples of the ceramic powder particles may include $(Ba_{1-x}Ca_x) TiO_3$ (0<x<1), $Ba (Ti_{1-y}Ca_y) O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) obtained by partially dissolving Ca or Zr in $BaTiO_3$.

In some example embodiments, the dielectric layer 111 may include fluorine (F). The dielectric layer 111 including fluorine (F), a low-temperature sintering aid may induce grain growth of dielectric grains included in the dielectric layer 111, which may have an advantage in terms of capacitance of the multilayer electronic component. However, in the case that the dielectric grains included in the dielectric layer 111 grow excessively, a rate of change in capacitance according to temperature and DC voltage may increase, and reliability may be reduced due to a decrease in the number of dielectric grains per dielectric layer. Accordingly, the dielectric layer 111 may not include fluorine (F) or may include fluorine (F) in a content less than a content of fluorine (F) included in the second region 112b or 113b.

An average thickness (td) of the dielectric layer 111 is not particularly limited. However, as the thickness of the dielectric layer 111 is reduced, withstand voltage and reliability properties of a multilayer electronic component may degrade, and cracks may easily occur due to stress generated when a voltage is applied. In a multilayer electronic component according to some example embodiments of the present disclosure, the second region 112b or 113b may include fluorine, and the content of fluorine (F) included in the second region 112b or 113b may be greater than the content of fluorine (F) included in the first region 112a or 113a, respectively. Accordingly, the multilayer electronic component may have improved reliability even when the average thickness (td) of the dielectric layer 111 is 0.4 μm or less.

Here, the average thickness (td) of the dielectric layer 111 may refer to a size of the dielectric layer 111, disposed between the internal electrodes 121 and 122, in a first direction. The average thickness of the dielectric layer 111 may be measured by scanning, with an SEM, a cross-section of the body 110 in first and second directions at a magnification of 10,000. More specifically, thicknesses of a plurality of points of one dielectric layer 111, for example, thirty points equally spaced apart from each other in a second direction, may be measured to measure an average value thereof. The thirty equally spaced points may be designated in a capacitance formation portion Ac to be described below. In addition, when such an average value measurement is performed on ten dielectric layers 111, the average thickness of the dielectric layer 111 may be further generalized.

A plurality of the internal electrode 121 or 122 may be disposed alternately with the dielectric layer 111. For example, the first internal electrode 121 and the second internal electrode 122, which may be a pair of electrodes having different polarities, may be disposed to oppose each other with the dielectric layer 111 interposed therebetween. The first internal electrode 121 and the second internal electrode 122 may be electrically isolated from each other by the dielectric layer 111 interposed therebetween.

The first internal electrode 121 may be disposed to be spaced apart from the fourth surface 4 of the body and to be connected to the third surface 3 of the body. In addition, the second internal electrode 122 may be disposed to be spaced apart from the third surface 3 of the body and to be connected to the fourth surface 4 of the body.

A conductive metal included in the internal electrode 121 or 122 may be one or more selected from the group consisting of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrode 121 or 122 may be formed by printing a conductive paste for an internal electrode including conductive metal to a predetermined thickness on a ceramic green sheet, and then performing sintering thereon. A method of printing the conductive paste may include a screen-printing method, a gravure-printing method, or the like, but the present disclosure is not limited thereto.

An average thickness (te) of the internal electrode 121 or 122 is not particularly limited. In a multilayer electronic component according to some example embodiments of the present disclosure, the second region 112b or 113b may include fluorine (F), and the content of fluorine (F) included in the second region 112b or 113b may be greater than the content of fluorine (F) included in the first region 112a or 113a. Accordingly, the multilayer electronic component may have improved reliability even when the average thickness (te) of the dielectric layer 111 is 0.4 μm or less.

Here, the average thickness (te) of the internal electrode 121 or 122 may refer to a thickness of the internal electrode 121 or 122 in a first direction. The average thickness (te) of the internal electrode 121 or 122 may be measured by scanning, with an SEM, a cross-section of the body 110 in first and second directions at a magnification of 10,000. More specifically, thicknesses of a plurality of points of one internal electrode 121 or 122, for example, thirty points equally spaced apart from each other in a second direction, may be measured to measure an average value thereof. The thirty equally spaced points may be designated in a capacitance formation portion Ac to be described below. In addition, when such average value measurement is performed on ten internal electrodes 121 or 122, the average thickness of the internal electrode 121 or 122 may be further generalized.

The body 110 may include a capacitance formation portion Ac disposed within the body 110, the capacitance formation portion Ac including first and second internal electrodes 121 and 122 disposed alternately with the dielectric layer 111 interposed therebetween to form a capacitance, and a first cover portion 112 and a second cover portion 113 respectively disposed on both end surfaces of the capacitance formation portion Ac opposing each other in a first direction. The cover portion 112 or 113 may basically serve to prevent damage to the internal electrode due to physical or chemical stress.

The cover portion 112 or 113 may include a first region 112a or 113a, respectively, adjacent to the capacitance formation portion Ac, and a second region 112b or 113b, respectively, adjacent to the outside of the cover portion. The first region 112a or 113a and the second region 112b or 113b may have a structure similar to that of the dielectric layer 111, and may include a $BaTiO_3$-based material as a main ingredient. In this case, the second region 112b or 113b may include a plurality of dielectric grains G2 and grain boundaries GB2 disposed between adjacent dielectric grains, and the grain boundaries GB2 may include fluorine (F).

Fluorine (F) included in the second region 112b or 113b may serve as a low-temperature sintering aid during a process of sintering the cover portion 112 or 113. Accordingly, the second regions 112b or 113b may be sintered at a low temperature by fluorine (F), thereby inducing grain growth and densification of the dielectric grains G2 included in the second region 112b or 113b. As a result, the second region 112b or 113b, adjacent to the outside of the cover portion 112 or 113, may have improved toughness to prevent cracks due to external impacts.

In some example embodiments, the second region 112b or 113b may further include at least one selected from the group consisting of Ca, Al, Li, Co, Zn, Mn, Mg, and S. Fluorine (F) included in the second region 112b or 113b may combine with the above elements to form a type of compound, and the compound may induce dielectric grain densification, such that an effect of improving toughness according to the present disclosure may be more significant.

According to some example embodiments of the present disclosure, the content of fluorine (F) included in the second region 112b or 113b may be greater than that of the fluorine (F) included in the first region 112a or 113a. Accordingly, grain growth of the dielectric grains G1 included in the first region 112a or 113a, adjacent to the capacitance formation portion Ac, may be controlled as compared to the dielectric grains G2 included in the second region 112b or 113b, thereby improving withstand voltage and reliability of a multilayer electronic component.

The content of fluorine (F) included in the first region 112a or 113a may be sufficient to be less than the content of fluorine (F) included in the second region 112b or 113b, and thus the grain boundaries GB1 of the first region 112a or 113a may include fluorine (F), but the present disclosure is not limited thereto, and the first region 112a or 113a may not include fluorine (F).

For example, the cover portion 112 or 113 may be formed by stacking one or more first dielectric patterns forming the first region 112a or 113a on the capacitance formation portion Ac, stacking one or more second dielectric patterns forming the second region 112b or 113b, and then performing sintering thereon. In this case, a fluorine (F) ingredient, a low-temperature sintering aid, may be added to the second dielectric patterns forming the second region, such that the content of fluorine (F) included in the second region may be greater than that of fluorine (F) included in the first region. Here, the fluorine (F) ingredient added to the second dielectric patterns may be, for example, in the form of a fluorine-based compound serving as an antistatic agent, but the present disclosure is not limited thereto.

A method of measuring the content of fluorine (F) included in the first region 112a or 113a and the content of fluorine (F) included in the second region 112b or 113b is not particularly limited. For example, fluorine (F) included in the first region 112a or 113a and fluorine (F) included in the second region 112b or 113b may be measured through anion analysis using time-of-flight secondary ion mass spectrometry (TOF-SIMS). The content of fluoride (F) may be a molar ratio or a weight ratio.

For example, fluorine (F) included in the first region 112a or 113a and the second region 112b or 113b may be measured by performing TOF-SIMS on a region, in which the first region 112a or 113a and the second region 112b or 113b are disposed, in a cross-section of the body 110 in first and second direction obtained by cutting the center of the body 110 in a third direction, or a cross-section of the body 110 in first and third directions obtained by cutting the center of the body 110 in a second direction. In this case, when anion analysis of the second region 112b or 113b is performed using TOF-SIMS, fluoride ions (F—) may be detected.

The content of fluorine (F) included in the second region 112b or 113b may be greater than the content of fluorine (F) included in the first region 112a or 113a. Accordingly, when a ratio of a detection intensity of the fluoride ions (F—) to a detection intensity of all anions in anion analysis of the first region using TOF-SIMS is referred to as I1, and a ratio of a detection intensity of the fluoride ions (F—) to a detection intensity of all anions in anion analysis of the second region using TOF-SIMS is referred to as I2, I2>I1 may be satisfied.

However, a method of measuring fluorine (F) included in the first region 112a or 113a and the second region 112b or 113b is not limited thereto, and fluorine (F) included in the first region 112a or 113a and the second region 112b or 113b may be measured using various detection methods such as X-ray photoelectron spectroscopy and infrared spectroscopy.

In some example embodiments, when an average size of the dielectric grains G1 included in the first region 112a or 113a is referred to as A1, and an average size of the dielectric grains G2 included in the second region 112b or 113b is referred to as A2, A2>A1 may be satisfied. A method of adjusting A1 and A2 is not particularly limited, but the average size A2 of the dielectric grains G2 included in the second region 112b or 113b may be adjusted to be greater than the average size A1 of the dielectric grains G1 included in the first region 112a or 113a through a difference in content of fluorine F, inducing grain growth of dielectric grains. By satisfying A2>A1, the above-described effect of improving toughness of the second region 112b or 113b and an effect of improving withstand voltage and reliability of a multilayer electronic component may be more significant.

For example, A1 and A2 may refer to average values of dielectric grain sizes obtained, for example, by obtaining, with an SEM, a 50,000× magnified image of the first region 112a or 113a and the second region 112b or 113b in a cross-section of the body 110 in first and second directions obtained by cutting the center of the body 110 in a third direction, or a cross-section of the body 110 in first and third directions obtained by cutting the center of the body 110 in a second direction, and then analyzing the image using an image analysis program, for example, the Zootos program by Zootos Co., Ltd. Alternatively, an average size of dielectric grains may be measured using the Sigma scan program.

A2 is not particularly limited, but may be, for example, 180 nm or more and 270 nm or less. When A2 is less than 180 nm, the above-described effect of improving toughness of the second region 112b or 113b may be insignificant. In addition, when A2 exceeds 270 nm, increased shrinkage due to excessive sintering of the second region 112b or 113b may increase stress, such that cracks or deformation defects may occur. A1 is not particularly limited, but may be, for example, 160 nm or more and 210 nm or less.

In some example embodiments, when a Ba/Ti molar ratio in the first region 112a or 113a is referred to as M1, and a Ba/Ti molar ratio included in the second region 112b or 113b is referred to as M2, M1>M2 may be satisfied. When M1>M2 is satisfied, grain growth of the dielectric grains G1 included in the first region 112a or 113a may be suppressed, as compared to the dielectric grains G2 included in the second region 112b or 113b. In addition, dispersion of the dielectric grains G1 included in the first region 112a or 113a may be controlled, thereby improving withstand voltage and reliability properties of a multilayer electronic component.

M1 is not particularly limited, but may be, for example, 0.999 or more and 1.05 or less. When M1 is less than 0.999, an effect of controlling grain growth of dielectric grains may be insignificant. In addition, when M1 is greater than 1.05, pores may increase in the first region 112a or 113a, resulting in a decrease in density. M2 is not particularly limited, but may be, for example, 0.998 or more and 1.02 or less.

A method of adjusting M1 is not particularly limited. For example, a Ba/Ti molar ratio may be increased by adding a Ba additive, such as an oxide and/or carbonate including Ba, to a ceramic slurry forming the first region 112a or 113a.

A method of measuring M1 and M2 is not particularly limited. However, for example, in a cross-section of the body 110 in first and second directions obtained by cutting the center of the body 110 in a third direction, or a cross-section of the body 110 in first and third directions obtained by cutting the center of the body 110 in a second direction, the first region 112a or 113a and the second region 112b or 113b may be measured using an SEM or transmission electron microscope (TEM) equipped with an X-ray microanalyzer (EPMA), or M1 and M2 may be measured using XRF or the like.

In some example embodiments, when an average thickness of the first region 112a or 113a is referred to as T1 and an average thickness of the second region 112b or 113b is referred to as T2, T2/T1 may be 1 or more and 4 or less. When T2/T1 satisfies the above range, an effect of improving toughness and an effect of improving withstand voltage and reliability properties according to the present disclosure may be more significant.

The average thickness T1 of the first region 112a or 113a may refer to an average size of the first region 112a or 113a in a first direction, and the average thickness T2 of the second region 112b or 113b may refer to an average size of the second region 112b or 113b in a first direction. In addition, T1 may be an average value of sizes of the first region 112a or 113a in a first direction measured at five equally spaced points on a cross-section of the body 110 in first and second directions obtained by cutting the center of the body 110 in a third direction or a cross-section of the body 110 in first and third directions obtained by cutting the center of the body 110 in a second direction, and T2 may be an average value of sizes of the second region 112b or 113b in a first direction measured at five equally spaced points on a cross-section of the body 110 in first and second directions obtained by cutting the center of the body 110 in a third direction or a cross-section of the body 110 in first and third directions obtained by cutting the center of the body 110 in a second direction. A boundary between the first region 112a or 113a and the second region 112b or 113b, respectively, may be a point at which a content of fluorine (F), a size of dielectric grains, and/or a Ba/Ti molar ratio of dielectric grains sharply changes, and T1 and T2 may be measured with respect to the boundary.

An average thickness of the cover portion 112 or 113 is not particularly limited. However, in a multilayer electronic component according to an example embodiment of the present disclosure, the second region 112b or 113b may include fluorine and the content of fluorine (F) included in the second region 112b or 113b may be greater than the content of fluorine (F) included in the first region 112a or 113a. Accordingly, even when the average thickness of the cover portion 112 or 113 is 20 μm or less, reliability of the multilayer electronic component may be secured.

Here, the average thickness of the cover portion 112 or 113 may refer to an average thickness of each of the first cover portion 112 and the second cover portion 113. In addition, the average thickness of the cover portion 112 or 113 may refer to an average size of the cover portion 112 or 113 in a first direction, and may be an average value of sizes of the cover portion 112 or 113 in a first direction measured at five equally spaced points on a cross-section of the body 110 in first and second directions.

The body 110 may include margin portions 114 and 115 respectively disposed on both surfaces of the capacitance formation portion Ac opposing each other in a third direction. That is, the margin portion 114 or 115 may refer to a region between both ends of the internal electrode 121 or 122 and a boundary surface of the body 110 in a cross-section of the body 110 obtained by cutting the body 110 in first and third directions. In this case, the margin portions 114 and 115 may include a first margin portion 114 disposed on a fifth surface 5 of the body 110 and a second margin portion 115 disposed on a sixth surface 6 of the body 110.

The margin portion 114 or 115 may include a material the same as that of the dielectric layer 111, except that the internal electrode 121 or 122 is not included. The margin portion 114 or 115 may basically serve to prevent damage to the internal electrode 121 or 122 by physical or chemical stress.

The margin portion 114 or 115 may be formed by applying a conductive paste for an internal electrode on a ceramic green sheet, except for a portion of the ceramic green sheet on which a margin portion is to be formed. Alternatively, in order to suppress a step caused by the internal electrode 121 or 122, the internal electrodes 121 and 122 may be stacked on each other and then cut to be connected to the fifth and sixth surfaces 5 and 6 of the body, and then a single dielectric layer or two or more dielectric layers may be stacked on both surfaces of the capacitance formation portion Ac opposing each other in a third direction to form the margin portion 114 or 115.

An average thickness of the margin portion 114 or 115 is not particularly limited. However, the average thickness of the margin portion 114 or 115 may be 20 μm or less for miniaturization and implementation of high capacitance of a multilayer electronic component. As described above, even when the average thickness of the margin portion 114 or 115 is 20 μm or less, the second region 112b or 113b may include fluorine, and the content of fluorine (F) included in the second region 112b or 113b may be greater than the content of fluorine (F) in the first region 112a or 113a, thereby securing reliability of the multilayer electronic component.

Here, the average thickness of the margin portion 114 or 115 may refer to an average thickness of each of the first margin portion 114 and the second margin portion 115. The average thickness of the margin portion 114 or 115 may refer to an average size of the margin portion 114 or 115 in a third direction, and may be an average value of sizes of the margin portion 114 or 115 in a third direction measured at five equally spaced points on a cross-section of the body 110 in first and third directions.

The external electrodes 131 and 132 may be disposed on the outside of the body 110 and respectively connected to the internal electrodes 121 and 122. The external electrodes 131 and 132 may include a first external electrode 131 disposed on a third surface and connected to the first internal electrode 121, and a second external electrode 132 disposed on a fourth surface 4 and connected to the second internal electrode 122. The external electrodes 131 and 132 may be disposed to extend onto portions of the first, second, fifth, and sixth surfaces 1, 2, 5, and 6.

The external electrode 131 or 132 may include a first electrode layer 131a or 132a, respectively, connected to the internal electrode 121 or 122, respectively, and a second electrode layer 131b or 132b disposed on the first electrode layer 131a or 132a, respectively. The first electrode layer 131a or 132a may include a metal and glass, and the glass may serve to improve bonding force between the body 110 and the external electrode 131 or 132.

The first electrode layer 131a or 132a may be formed by dipping the third and fourth surfaces 3 and 4 of the body 110 into a conductive paste for an external electrode including a conductive metal and glass, and then performing sintering thereon. Alternatively, the first electrode layer 131a or 132a may be formed by transferring a sheet including a conductive metal and glass.

The conductive metal included in the first electrode layer 131a or 132a may include at least one selected from the group consisting of copper (Cu), nickel (Ni), palladium (Pd), platinum (Pt), gold (Au), silver (Ag), lead (Pb), and alloys thereof, but the present disclosure is not limited thereto.

The second electrode layer 131b or 132b may improve mounting properties. A type of the second electrode layer 131b or 132b is not particularly limited, and may be a plating layer including at least one selected from the group consisting of nickel (Ni), tin (Sn), palladium (Pd), and alloys thereof, and may be formed as a plurality of layers. The second electrode layer 131b or 132b may be, for example, a nickel (Ni) plating layer or a tin (Sn) plating layer, and may have a form in which a nickel (Ni) plating layer and a tin (Sn) plating layer are sequentially formed. In addition, the second electrode layer 131b or 132b may include a plurality of nickel (Ni) plating layers and/or a plurality of tin (Sn) plating layers.

In the drawings, a structure is illustrated in which the multilayer electronic component 100 has two external electrodes 131 and 132, but the present disclosure is not limited thereto, and the number and shape of the external electrodes 131 and 132 may be changed depending on a shape of the internal electrode 121 or 122 or other purposes.

Hereinafter, a multilayer electronic component according to another example embodiment of the present disclosure will be described. However, the multilayer electronic component according to an example embodiment of the present disclosure may have a configuration the same as that of the multilayer electronic component according to an example embodiment of the present disclosure described above. Therefore, a repeated description will be omitted.

The multilayer electronic component 100 according to some example embodiments of the present disclosure may include a body 110 including a capacitance formation portion Ac including a dielectric layer 111 and an internal electrode 121 or 122 alternately disposed in a first direction and a cover portions 112 and 113 disposed on both end surfaces of the capacitance formation portion opposing each other in the first direction, and an external electrode 131 or 132 disposed on the outside of the body and connected to the internal electrode. The cover portion may have a first region 112a or 113a, adjacent to the capacitance formation portion, and a second region 112b or 113b, adjacent to the outside of the cover portion. The second region may include fluorine (F). When an average size of dielectric grains G1 included in the first region is referred to as A1 and an average size of dielectric grains G2 included in the second region is referred to as A2, A2>A1 may be satisfied.

As described above, fluorine (F) included in the second region 112b or 113b may serve as a low-temperature sintering aid during a process of sintering the cover portion 112 or 113, thereby inducing grain growth and densification of the dielectric grains G2 included in the second region 112b or 113b. As a result, the second region 112b or 113b, adjacent to the outside of the cover portion 112 or 113, may have improved toughness to prevent cracks due to external impacts.

In addition, by satisfying A2>A1, the second region 112b or 113b, adjacent to the outside of the cover portion 112 or 113, may have improved toughness to prevent the occurrence of cracks due to external impacts, and grain growth of the first region 112a or 113a, adjacent to the capacitance formation portion Ac, may be controlled to secure withstand voltage and reliability properties of a multilayer electronic component.

Experimental Example

<Comparison Between Size of Dielectric Grains Included in First Region and Size of Dielectric Grains Included in Second Region>

First, a dielectric layer and an internal electrode were stacked to form a capacitance formation portion, a first dielectric pattern forming a first region was stacked on both cross-sections of the capacitance formation portion opposing each other in a first direction, and a second dielectric pattern forming a second region was stacked and then sintered to prepare a body including a cover portion.

In this case, the first and second dielectric patterns were formed by printing and drying a ceramic slurry including a BaTiO$_3$-based powder particles, a binder, an organic solvent, and a dispersant on a carrier film. In this case, no fluorine-based compound was added to the ceramic slurry forming the first dielectric pattern, but a Ba additive was added, such that a Ba/Ti molar ratio of dielectric grains included in the first region after sintering was 0.999 to 1.05. In addition, a fluorine-based compound was added as an antistatic agent to the ceramic slurry forming the second dielectric pattern.

Subsequently, a sample chip of the experimental example was prepared by forming an external electrode connected to an internal electrode on the outside of the body. A sample chip of a comparative example was prepared in the same manner as the experimental example. However, the sample chip of the comparative example had no fluorine-based compound added and was manufactured as a single cover portion without a distinction between the region adjacent to the capacitance formation portion and the region adjacent to the outside of the cover portion.

Subsequently, average sizes A1 and A2 of dielectric grains included in the first and second regions, respectively, were measured. In a cross-section of the body in first and second directions obtained by cutting the center of the body in a third direction, a 50,000× magnified image of a central region of the cover portion in a second direction was observed with an SEM.

Figure 5:
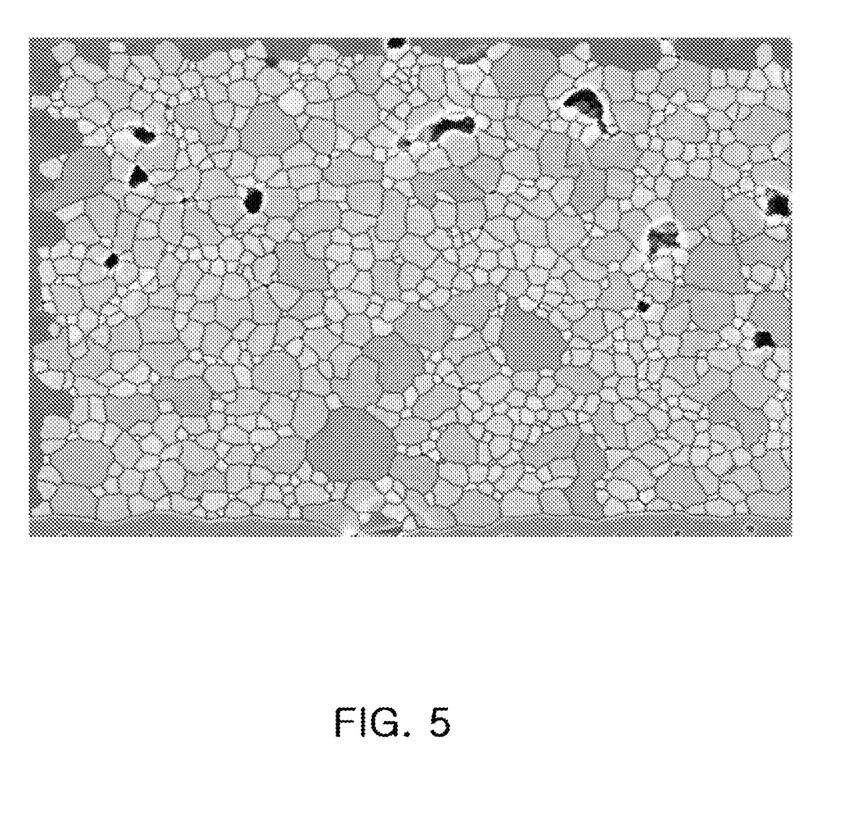
FIG. 5 is an image of a first region of an experimental example, captured with a scanning electron microscope (SEM)
Figure 6:
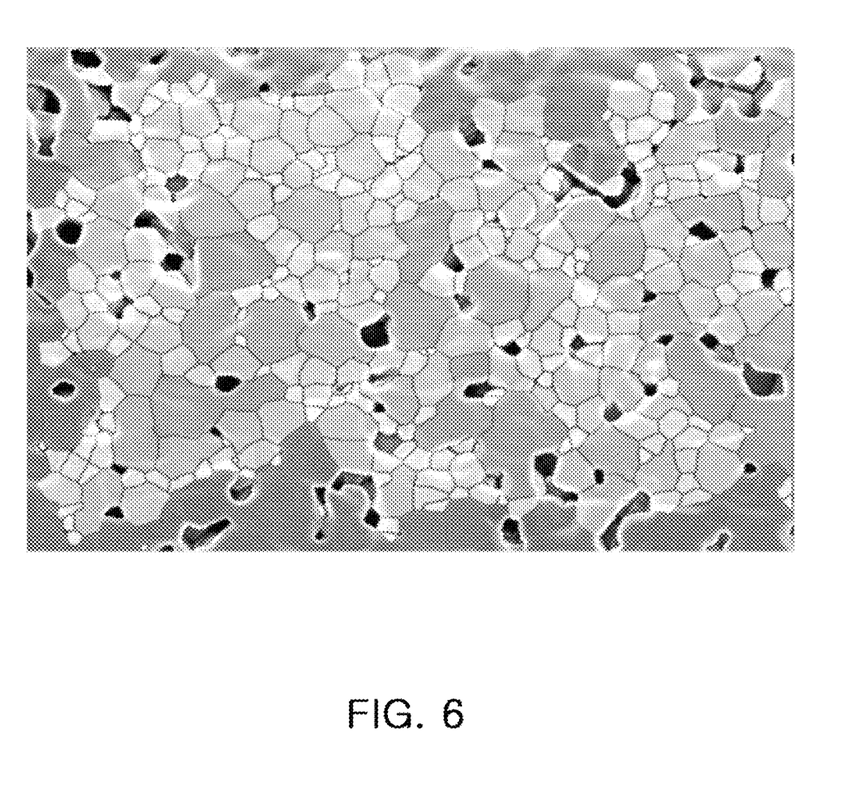
FIG. 6 is an image of a second region of an experimental example, captured with an SEM.

FIG. 5 is an image of a first region of the experimental example, captured with an SEM. FIG. 6 is an image of a second region of the experimental example, captured with an SEM. Referring to FIGS. 5 and 6, it can be confirmed that the second region of the experimental example includes dielectric grains having an average size larger than that of dielectric grains included in the first region of the experimental example. This is expected to be due to fluorine (F) included in the second region served as a low-temperature sintering aid to induce grain growth of the dielectric grains included in the second region.

<Evaluation of Toughness of Second Region>

Subsequently, anion analysis using TOF-SIMS was performed on a second region of each sample chip. A ratio of a detection intensity of a fluoride ions (F—) to a detection intensity of all anions was measured and indicated in in Table 1 below. In addition, TOF-SISMS of the second region of each sample chip was performed on a region having a size in a second direction×a size in a third direction=100 μm×100 μm after etching an external surface of a second region disposed on a first or second surface of each sample chip by approximately 10 nm.

In addition, a toughness of the second region was measured using a Vickers hardness tester with respect to the external surface of the second region disposed on the first or second surface, and was indicated in Table 1 below.

TABLE 1

| Division | Detection Intensity of Fluoride ions | Toughness (MPa · m$^{1/2}$) |
| --- | --- | --- |
| Experimental Example | 10.5 | 2.370 |
| Comparative Example | 3.9 | 1.017 |

Referring to Table 1 above, it can be confirmed that in the experimental example, fluorine (F) included in the second region increases a detection intensity of strong fluoride ions during TOF-SIMS. In addition, it can be confirmed that fluorine (F), serving as a low-temperature sintering aid, induces grain growth and densification of dielectric grains included in the second region of the cover portion, resulting in improved toughness.

Conversely, it can be confirmed that in the comparative example, a detection intensity of fluoride ions during TOF-SIMS is significantly low, as compared to the experimental example, and thus toughness is low, as compared to the experimental example. In the comparative example, no fluorine-based compound was added when the second region is formed, but it is expected that a small number of fluoride ions (F—) were detected due to noise.

<Evaluation of Moisture Resistance Reliability>

Subsequently, evaluation of moisture resistance reliability was performed on the sample chips of the experimental example and the comparative example. The evaluation of moisture reliability was performed on 400 sample chips of each of the experimental and comparative examples by applying a temperature of 85° C., a humidity of 85%, and a voltage of 1.5 Vr for 12 hours, and then measuring a change in insulation resistance value.

Figure 7:
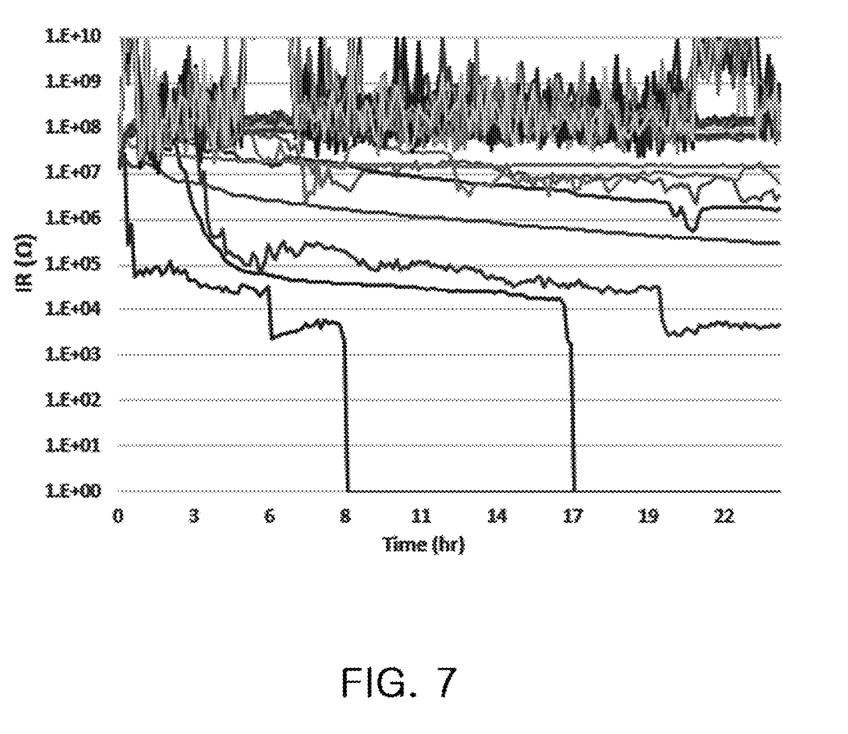
FIG. 7 is a graph illustrating a moisture resistance reliability evaluation result of a comparative example.
Figure 8:
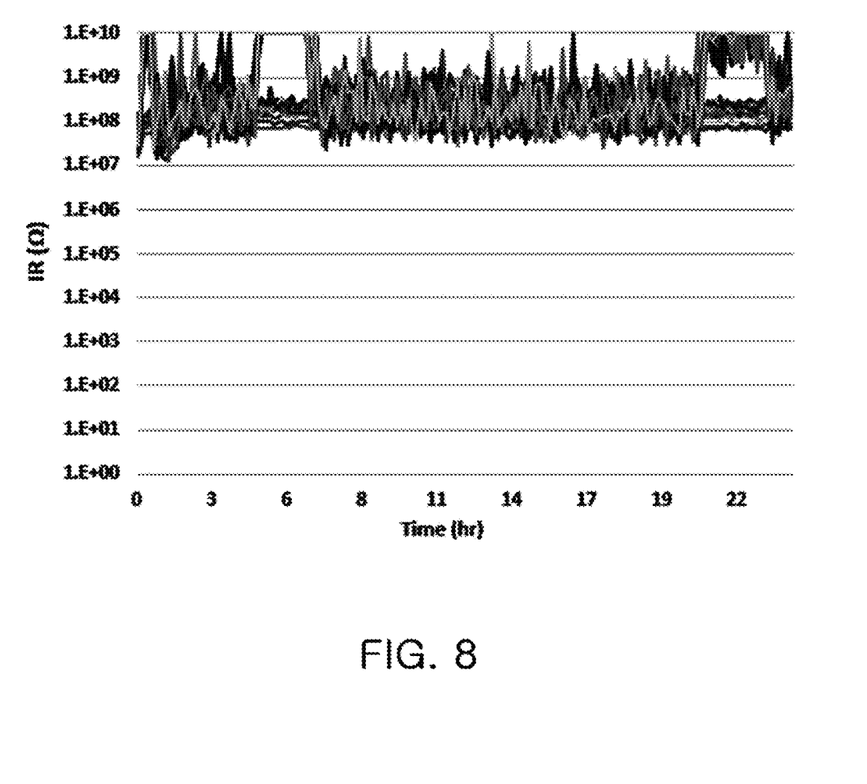
FIG. 8 is a graph illustrating a moisture resistance reliability evaluation result of an experimental example.

FIG. 7 is a graph illustrating a moisture resistance reliability evaluation result of a comparative example, and FIG. 8 is a graph illustrating a moisture resistance reliability evaluation result of an experimental example. Referring to FIGS. 7 and 8, in the experimental example, there were no sample chips having an insulation resistance falling below $10^7 \Omega$, whereas in the comparative example, there were numerous sample chips having an insulation resistance falling below $10^7 \Omega$. It was confirmed that fluorine (F) included in the second region induces grain growth of the dielectric crystals included in the second region to increase toughness and improve density, thereby preventing external moisture from penetrating into the chip and improving moisture resistance reliability.

While example embodiments have been shown and described above, it will be apparent to those skilled in the art that modifications and variations could be made without departing from the scope of the present disclosure as defined by the appended claims.

In addition, the term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

The terms used herein is for the purpose of describing particular example embodiments only and is not to be limiting of the example embodiments. As used herein, the singular forms "a," "an," and "the" are intended to include the plural forms as well, unless the context clearly indicates otherwise.

What is claimed is:

1. A multilayer electronic component comprising:
a body including a capacitance formation portion including at least one dielectric layer and at least one internal electrode alternately disposed in a first direction, and a cover portion disposed on both end surfaces of the capacitance formation portion opposing each other in the first direction; and
an external electrode disposed on an outside of the body and connected to the internal electrode,
wherein the cover portion has a first region disposed on the body and adjacent to the capacitance formation portion, and a second region disposed on the first region and adjacent to the outside of the cover portion, and
a content of fluorine (F) included in the second region is greater than a content of fluorine (F) included in the first region.

2. The multilayer electronic component of claim 1, wherein the second region includes a plurality of dielectric grains and grain boundaries disposed between adjacent dielectric grains and including fluorine (F).

3. The multilayer electronic component of claim 1, wherein A2>A1 is satisfied, when an average size of dielectric grains included in the first region is referred to as A1 and an average size of dielectric grains included in the second region is referred to as A2.

4. The multilayer electronic component of claim 3, wherein A2 is 180 nm or more and 270 nm or less.

5. The multilayer electronic component of claim 1, wherein M1>M2 is satisfied, when a Ba/Ti molar ratio in the first region is referred to as M1 and a Ba/Ti molar ratio in the second region is referred to as M2.

6. The multilayer electronic component of claim 5, wherein M1 is 0.999 or more and 1.05 or less.

7. The multilayer electronic component of claim 1, wherein fluoride ions (F—) are detected, when anion analysis of the second region is performed using time-of-flight secondary ion mass spectrometry (TOF-SIMS).

8. The multilayer electronic component of claim 7, wherein I2>I1 is satisfied, when a ratio of a detection intensity of the fluoride ions (F—) to a detection intensity of all anions in anion analysis of the first region using TOF-SIMS is referred to as I1, and a ratio of a detection intensity of the fluoride ions (F—) to a detection intensity of all anions in anion analysis of the second region using TOF-SIMS is referred to as I2.

9. The multilayer electronic component of claim 1, wherein the second region includes a $BaTiO_3$-based material as a main ingredient, and further includes at least one selected from the group consisting of Ca, Al, Li, Co, Zn, Mn, Mg, and S.

10. The multilayer electronic component of claim 1, wherein T2/T1 is 1 or more and 4 or less, when an average thickness of the first region is referred to as T1 and an average thickness of the second region is referred to as T2.

11. The multilayer electronic component of claim 1, wherein the dielectric layer includes fluorine (F).

12. The multilayer electronic component of claim 1, wherein the dielectric layer does not include fluorine (F) or includes fluorine (F) in a content less than a content of fluorine (F) included in the second region.

13. A multilayer electronic component comprising:
a body including a capacitance formation portion including at least one dielectric layer and at least one internal electrode alternately disposed in a first direction, and a cover portion disposed on both end surfaces of the capacitance formation portion opposing each other in the first direction; and
an external electrode disposed on an outside of the body and connected to the internal electrode,
wherein the cover portion has a first region, adjacent to the capacitance formation portion, and a second region, adjacent to the outside of the cover portion,
the second region includes fluorine (F), and
A2>A1 is satisfied, when an average size of dielectric grains included in the first region is referred to as A1 and an average size of dielectric grains included in the second region is referred to as A2.

14. The multilayer electronic component of claim 13, wherein A2 is 180 nm or more and 270 nm or less.

15. The multilayer electronic component of claim 13, wherein M1>M2 is satisfied, when a Ba/Ti molar ratio in the first region is referred to as M1 and a Ba/Ti molar ratio in the second region is referred to as M2.

16. The multilayer electronic component of claim 15, wherein M1 is 0.999 or more and 1.05 or less.

* * * * *